United States Patent [19]

Horn

[11] Patent Number: 5,339,152
[45] Date of Patent: Aug. 16, 1994

[54] HOLOGRAPHIC INSPECTION SYSTEM WITH INTEGRAL STRESS INDUCER

[75] Inventor: Michael Horn, South Setauket, N.Y.

[73] Assignee: Grumman Aerospace Corporation, Bethpage, N.Y.

[21] Appl. No.: 873,225

[22] Filed: Apr. 24, 1992

[51] Int. Cl.5 .................................................. G01B 9/021
[52] U.S. Cl. ...................................... 356/347; 356/353
[58] Field of Search ............... 356/353, 349, 348, 347; 359/1

[56] References Cited

U.S. PATENT DOCUMENTS

| | | | |
|---|---|---|---|
| 3,548,643 | 12/1970 | Leith et al. | 73/71.3 |
| 3,572,936 | 3/1971 | Johnson et al. | 356/109 |
| 3,631,713 | 1/1972 | Marom et al. | 73/67.3 |
| 3,649,754 | 3/1972 | Macovski | 178/6.8 |
| 3,690,159 | 9/1972 | Kersch et al. | 73/88 A |
| 3,828,126 | 8/1974 | Ramsey, Jr. | 178/6.8 |
| 4,084,427 | 4/1978 | Jacoby et al. | 73/88 A |
| 4,463,378 | 7/1984 | Rambow | 358/112 |
| 4,481,821 | 11/1984 | Chamuel | 73/617 |
| 4,506,945 | 3/1985 | Newman | 356/347 |
| 4,643,514 | 2/1987 | Raviv et al. | 350/3.6 |
| 4,717,914 | 1/1988 | Scott | 340/825 |
| 4,774,573 | 9/1988 | Mount, II et al. | 358/112 |
| 4,798,466 | 1/1989 | Bouteyre et al. | 356/347 |
| 4,812,042 | 3/1989 | Yokokura et al. | 356/348 |
| 5,094,528 | 3/1992 | Tyson, III et al. | 356/353 |
| 5,113,079 | 5/1992 | Matulka | 356/347 |

FOREIGN PATENT DOCUMENTS 9149921 10/1991 European Pat. Off. ............. 356/353

*Primary Examiner*—Robert J. Warden
*Assistant Examiner*—T. A. Trembley
*Attorney, Agent, or Firm*—Bacon & Thomas

[57] ABSTRACT

An apparatus for remote inspection of a surface such as a drilled fastener hole of the type used in the aerospace industry includes a borescope having an integral stress inducer at one end for inducing stress directly in the surface to be evaluated. A holographic image of the surface is captured by directing a coherent radiation beam off the surface and shearing and recombining the reflected beam in a shearing interferometer. Inducement of stress and capture of the holographic images is synchronized by capturing the images at a frequency which is synchronized with the frequency of the induced stress wave in the surface, thus permitting overlapping of maximally stressed and unstressed images, and thereby eliminating the blurring which previously limited the application of holographic interferometry techniques in this context. The probe is rotatable to permit scanning of the surface and preferably includes a minimal number of optical elements in order to ensure maximum reliability, minimum cost, and the most effective space utilization.

47 Claims, 1 Drawing Sheet

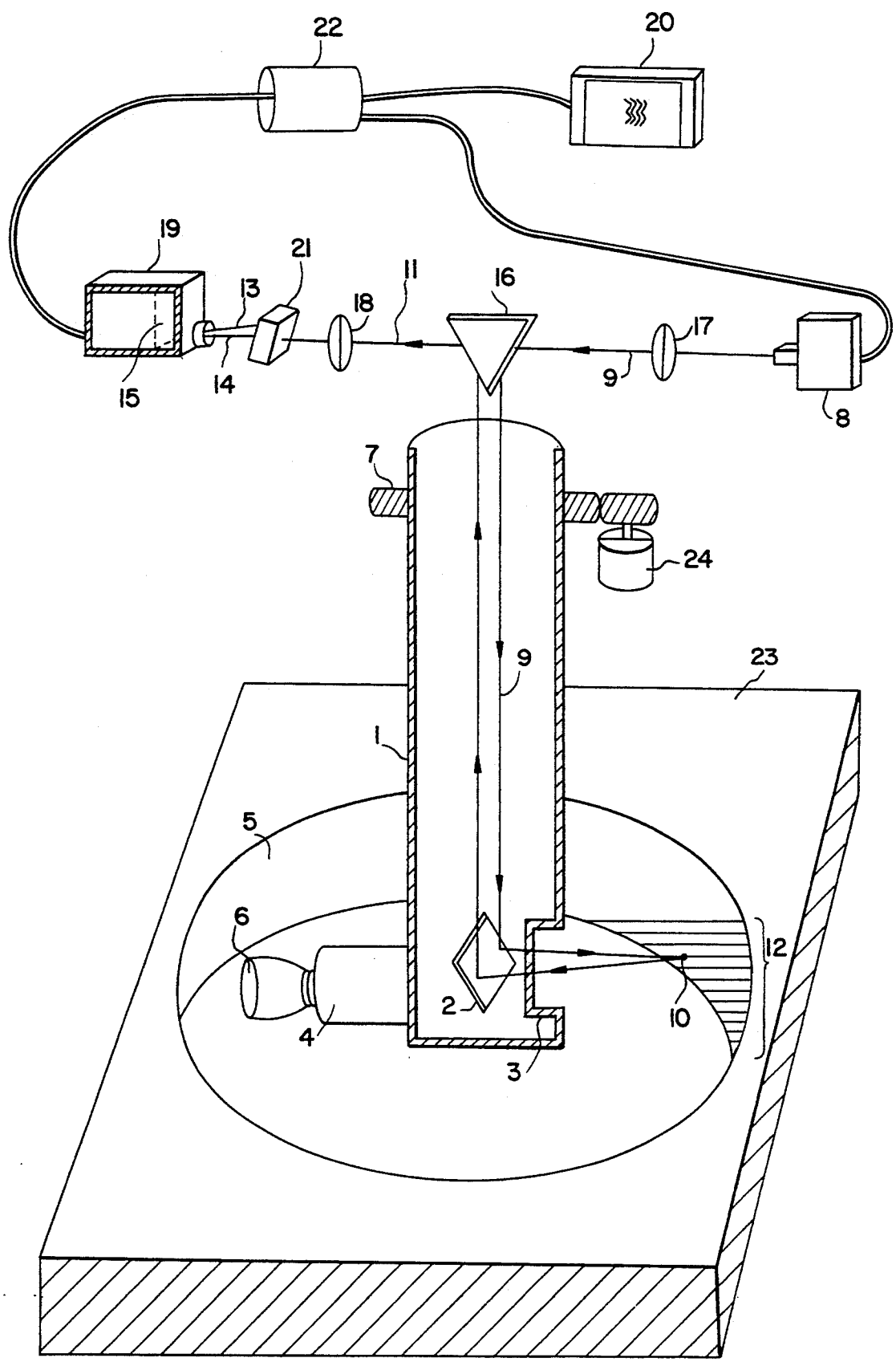

HOLOGRAPHIC INSPECTION SYSTEM WITH INTEGRAL STRESS INDUCER

BACKGROUND OF THE INVENTION

1. Field of the Invention

The invention relates generally to the field of holographic interferometry and in particular to an apparatus for evaluating defects in a remote surface while simultaneously inducing stress in the surface.

2. Description of Related Art

A variety of inspection and testing techniques have been devised to evaluate the structural integrity of mechanical parts employed in the aircraft industry. Of special concern is the evaluation of the nature of defects inside fastener holes. Such defects are a major source of degenerative failure resulting from microscopic cracking caused by drilling of the holes and the subsequent fatigue loading. The most widely used technique for evaluating fastener hole defects is eddy current inspection, which employs magnetic fields as an interrogating medium. However, eddy current inspection is restricted by the size of crack that can be detected. Cracks too small to be detected by eddy current inspection can cause problems and present a significant safety hazard. A system is needed which eliminates the threshold size detection restriction suffered by eddy current systems.

An alternative technique for measuring defects manifested by deformation of a structural element under stress is interferometry, and in particular holographic interferometry. Holographic interferometry is based on the property that upon reconstruction of an image capture medium, such as a photographic emulsion or an electronic image storage memory, which has been multiply exposed to form several superimposed holograms, the several corresponding virtual and real images are respectively formed simultaneously and therefore interfere. The interference is indicative of the extent of deformation during the observation period.

A hologram is an image with a well-defined amplitude and phase distribution. The phase of a reflected wavefront contains information on the distance traversed by the wave between the object and the point at which the image is captured. By choosing a suitable wavelength, knowledge of phase differences permits measurement of changes in the position of the point of reflection over distances of less than one wavelength.

The phase of an image is captured by causing the wavefront to interfere with a wavefront of known phase or by causing the wavefront to interfere with itself, for example by using a device known as a shearing interferometer. In a shearing interferometer, interference is caused by splitting a collimated beam and either phase shifting or expanding part of the beam before causing the constituent parts to interfere. Shearing interferometers have the advantage of simplicity and are relatively inexpensive in comparison with systems using external reference beams.

While conventional interferometric systems have been successfully employed for purposes of evaluating external surfaces of large scale metal structures, they are not suitable for use in situations in which the surfaces to be evaluated are located in confined spaces, and which require evaluation on a microscopic level. Such surfaces are found, for example, in drilled fastener holes of the type noted above. While endoscopic probes exist for penetrating into confined spaces, the images produced are generally unsuitable for more than a superficial analysis of the surface in question. A more detailed analysis has heretofore been impossible, due to image processing limitations and the impossibility, using conventional equipment, of applying stress to the surface and capturing a meaningful image of the stressed surface.

While the mechanical strength of the fastener most often offsets the inherent weakness caused by the hole as it becomes a source of degenerative failure from cracking, the role of rivets and bolts would be substantially improved if the health of the hole could be more easily determined, thereby providing more reliable data for fatigue life evaluation. The combination of both stress inducement in the inspected surface, and interferometric evaluation of the deformation caused by the stress has, however, heretofore been impossible to achieve using conventional testing apparatus.

SUMMARY OF THE INVENTION

In view of the problems associated with previous testing systems, it is a first objective of the invention to provide an improved apparatus and method which permits holographic inspection and recordation of remotely located surfaces such as the surfaces of drilled holes or bores, and which includes stress inducement near or at the point of inspection.

It is a second objective of the invention to provide an improved apparatus and method of inspecting remotely located surfaces such as the interior surfaces of drilled holes which utilizes both stress inducement at the point of inspection and also holographic interferometry techniques.

It is a third objective of the invention to provide an improved apparatus and method of inspecting remotely located surfaces such as the interior surfaces of drilled holes which utilizes holographic interferometry techniques in which the contrast of images obtained by these techniques is maximized.

The first objective of the invention is achieved by providing a probe which can be placed in a remote location and which includes a novel arrangement of optical elements for guiding a coherent light beam such as a laser beam toward a selected surface and guiding the reflected beam out of the probe toward an image capture system, the image capture system including means for extracting and recording the phase of the reflected beam, and in which the end of the probe includes an integral transducer. The coherent light guiding means preferably includes internally positioned optical elements such as mirrors, prisms, and lenses, while the transducer is, according to a preferred embodiment of the invention, a piezoelectric crystal arranged to apply stress directly to a surface of the hole adjacent or including the selected surface. In accordance with the preferred embodiment of the invention, the image capture and phase extraction system includes a shearing interferometer made up of a beam splitter and focusing lens, a video camera, and a digital memory for storing the resulting fringe patterns so that they can be superimposed in order to determine the extent of deformation of the selected surface upon application of a predetermined amount of stress.

The second objective of the invention is achieved by providing a probe of the type described above, including an integral transducer, in which a shearing interferometer is used to thereby eliminate the need for an external reference source and to reduce the size of the required apparatus.

The third objective of the invention is achieved by obtaining an image of a selected unstressed surface, digitizing the image, obtaining a second image while the surface is under maximum stress, and then combining the two images to produce deformation fringe patterns whose fringe lines represent the deformations occurring in the structure while under maximum stress. By synchronizing the timing between image capture and inducement in the surface of maximum stress, the intensity of the deformation fringe patterns may be maximized to clearly distinguish the peaks of the fringe pattern from surrounding noise.

These and other objectives of the invention will become apparent from the following detailed description of a preferred embodiment of the invention, with reference to the accompanying drawing.

BRIEF DESCRIPTION OF THE DRAWING

The drawing FIGURE is a schematic view of the various constituent components of a holographic inspection system constructed in accordance with the principles of a preferred embodiment of the invention.

DETAILED DESCRIPTION OF THE PREFERRED EMBODIMENT

Referring to the FIGURE, a preferred holographic inspection system includes a laser source 8, a probe or bore scope 1 in the form of a hollow cylindrical or tubular member adapted to be longitudinally inserted into a bore or drilled hole 5 in a structure 23 to be inspected, and an image capture system 19. It will of course be appreciated by those skilled in the art, however, that the various elements of the preferred embodiment are illustrated schematically, and that the exact form of the probe, laser source, image capture system, and other components of the preferred system may be varied according to the specific use to which the system is put, for example by adapting the probe to inspect different surfaces. Thus, although the following description will enable those skilled in the art to implement the invention, it is not to be construed as limiting, but rather is intended to be illustrative in nature.

According to the preferred embodiment, radiation is directed through the probe as follows: Laser source 8 generates a laser beam 9 and directs it through lens 17. Lens 17 focuses laser beam 9 onto a prism 16 which in turn redirects laser beam 9 into probe 1. Probe 1 channels the laser beam 9 through its body to internal mirror 2 in order to give the bore scope a 90° field of view. Mirror 2 redirects laser beam 9 out of probe 1, through mirror window 3, and onto a selected surface 12 at point of reflection 10.

Radiation containing information about the surface 12 is then captured as follows: Reflected image 11 from point of reflection 10 travels into probe 1 through mirror window 3 and onto mirror 2. Mirror 2 then redirects reflected image 11 up through and out of the body of probe 1 and onto prism 16. Together, prism 16 and mirror 2 form a single optical system for guiding the laser through the probe and onto the surface. The mirror and prism are also positioned to guide the beam out of the probe, thereby minimizing the number of elements required to interrogate the surface with the single coherent light beam required by the preferred system. Nevertheless, it will be appreciated that optical elements other than the preferred prism and mirror may be substituted or added, including additional lenses and mirrors, or optical fiber light guides.

Prism 16 redirects reflected image 11 through lens 18 into a shearographic interferometer, including a beam splitter 21 which constitutes part of a phase extraction system for obtaining phase information from the reflected beam. Beam splitter 21 splits reflected image 11 into two beams representing parallax displaced views of the selected surface. The two beams include a phase shifted beam 13 and an in-phase beam 14. Phase shifted beam 13 and in-phase beam 14 are focused by a lens towards a point on focal plane 15 which lies within image capture system 19, thereby merging the displaced views to form overlapping images of the selected surface. In the example shown, the image capture system includes a television camera or CCD which records the interference fringe pattern caused by the intersection of phase shifted beam 13 and in-phase beam 14 at focal plane 15. Both the beam splitter and phase shifting function may be performed by a single device such a plane parallel plate, while focusing generally requires an appropriate lens. Numerous such devices are commercially available or known to those skilled in the art.

At the mirror end of probe 1 is an integral stress-inducing transducer for applying stress to the surface under inspection. The probe is axially rotatable and longitudinally translatable by a precision rotating mechanism, represented by gear 7 and motor 24. Of course, numerous different precision rotating mechanisms are known and the invention is intended to encompass all such rotating mechanisms. Rotation of the probe permits the entire bore or drilled hole surface to be scanned and inspected. Although depicted as being located diametrically opposite the window 3 through which the laser light exits the probe, the transducer may actually be positioned anywhere on the circumference of the probe, and may even be positioned adjacent window 3 for maximum stress at the surface whose image is being captured. Transducer 4 can take a variety of forms, including a piezoelectric crystal. Any means which may be controlled for the purpose of applying stress to the surface are intended to be included within the scope of the invention, including magnetically, thermally, and hydraulically activated devices.

Transducer 4 includes a portion 6 which contacts the surface and thereby causes a stress wave or waves to be induced in the surface, the displacement of the point of inspection as the wave passes giving rise to a phase shift in the reflected beam and a consequent shift in the interference pattern resulting when the split beam is recombined at the focal plane of camera 19. In order to achieve the greatest contrast between images of the stressed and unstressed surfaces, a timer is provided for synchronizing the transducer and the camera so that images are captured only when the stress waves through the point of inspection is maximum as the probe is rotated to scan the surface.

Using conventional techniques, the shearographically produced hologram image would have had as its components the fringes generated by all phases of the stress waves as they passed through the defective surface under inspection. As a consequence, some defects would appear somewhat blurred and indistinct because of the randomness in selecting the moment that the second image is captured. According to the preferred invention, on the other hand, in order to obtain the highest contrast in the final holographic image, the final image contains only images of the unstressed and maximum stressed surfaces. In other words, the initial image of the completely unstressed surface is overlapped by a second image made during the moment of maximum displacement on the initial surface. This is achieved by capturing the images at a frequency that is synchronized with the frequency of the stress wave, the maximum displacements of which occur at integral values of pi.

The two parallax displaced views, which are merged back into the camera as overlapping images, may then be digitized and stored in an electronic buffer for reference at a later time. Other storage methods such as the formation of photographic slides may also be used, although digital storage is presently preferred. Subsequent frames of sheared images can then be overlapped with the image stored in the buffer to create a holographic image of the field of view. With the application of stress induced by the transducer, the subsequent frames produce an overlapped image with fringes corresponding to the magnitude of the applied stress.

When the system is fully operational, the rotator mechanism, including gear 7 and motor 24, drives the bore/transducer structure to rotate within hole 5. This rotation enables the laser to sweep across the entire inside surface of the hole and the TV camera to perform the shearographic imaging of the constantly changing, stressed surface. Cracks encountered in the hole will be clearly discernable above scratches because each has a markedly different fringe pattern when viewed under stress on a TV display.

Those skilled in the art will appreciate that numerous variations other than those described above are possible within the intended scope of the invention. Therefore, the above description should not be construed as limiting, but rather the invention should be defined solely by the appended claims.

I claim:

1. An apparatus for remote inspection of a surface, comprising:
   a radiation source including means for emitting coherent radiation;
   probe means including a probe for guiding said coherent radiation onto a selected surface and thereby cause the coherent radiation to reflect from the surface, said probe comprising means integral with the probe for inducing stress in the surface; and
   phase extraction means for extracting phase information from said coherent radiation reflected from said surface,
   wherein said probe is an elongated member and said stress inducing means comprises a transducer positioned at an end of said elongated member.

2. An apparatus as claimed in claim 1, wherein said radiation source is a laser.

3. Apparatus as claimed in claim 1, wherein said phase extraction means includes a beam splitter for splitting the coherent radiation reflected from said selected surface into two parts, means for phase-shifting one of the two parts, and means for recombining the two parts to thereby create an interference pattern.

4. Apparatus as claimed in claim 3, further comprising image capture means for capturing and recording said phase information.

5. Apparatus as claimed in claim 4, wherein said phase extraction means further comprises shearographic interferometer means for splitting an image including said phase information into two parallax displaced images and merging the two parallax displaced images onto a focal plane of said image capture means as overlapping images.

6. Apparatus as claimed in claim 1, wherein said elongated member is a cylinder and said probe means further comprises first guiding means at one end of said cylinder for directing said coherent radiation into said cylinder and second guiding means, adjacent a second end of said cylinder for guiding said coherent radiation out of said cylinder onto said selected surface.

7. Apparatus as claimed in claim 6, wherein said second guiding means comprises means for guiding said coherent radiation onto said selected surface in a direction perpendicular to a principal longitudinal axis of said cylinder.

8. Apparatus as claimed in claim 6, said first guiding means comprises a prism, and wherein said cylinder further comprises third guiding means including said prism for guiding coherent radiation reflected from said selected surface to said first end and out of said cylinder.

9. Apparatus as claimed in claim 8, wherein said phase extraction means includes a beam splitter for splitting the coherent radiation reflected from said surface into two parts, means for phase-shifting one of the two parts, and means for recombining the two parts to thereby create an interference pattern.

10. Apparatus as claimed in claim 9, further comprising image capture means for capturing an image of said interference pattern.

11. Apparatus as claimed in claim 10, further comprising means for rotating said cylinder about a longitudinal axis thereof to thereby cause said coherent radiation to be directed onto different surfaces of a bore into which the cylinder is placed; and timing means for synchronizing said image capture means, stress inducing means, and rotating means to cause an image to be captured for each selected surface simultaneously with a maximum induced stress on said selected surface.

12. Apparatus as claimed in claim 6, wherein said second guiding means includes a mirror positioned to reflect coherent radiation from said first guiding means onto said selected surface, and to reflect coherent radiation reflected from said selected surface to a third guiding means for guiding coherent radiation reflected from said surface to said first end and out of said cylinder, said third guiding means comprising a prism positioned to reflect radiation received from said mirror onto said phase extraction means.

13. Apparatus as claimed in claim 6, wherein said second guiding means comprises a mirror positioned to reflect coherent radiation from said first guiding means onto said selected surface.

14. Apparatus as claimed in claim 1, wherein said transducer is a piezoelectric transducer.

15. Apparatus as claimed in claim 1, wherein said elongated member is constructed to enter a bore in the structure to be inspected, said selected surface being located in said bore.

16. Apparatus as claimed in claim 15, wherein said elongated member is a hollow cylinder having a longitudinal axis, one end of said hollow cylinder having mounted thereon said stress inducing means.

17. Apparatus as claimed in claim 16, wherein said stress inducing means comprises a piezoelectric transducer.

18. Apparatus as claimed in claim 17, further comprising means for rotating said elongated member about said longitudinal axis to thereby cause said probe to direct said coherent radiation onto different portions of said selected surface.

19. Apparatus as claimed in claim 18, further comprising means for translating said elongated member in directions parallel to said longitudinal axis to thereby cause said elongated member to enter said bore.

20. Apparatus as claimed in claim 19, further comprising means for translating said elongated member in a direction parallel to said longitudinal axis to thereby cause said elongated member to enter said bore.

21. An apparatus for remote inspection of a surface, comprising:
   a radiation source including means for emitting coherent radiation;
   probe means including a probe for guiding said coherent radiation onto a selected surface and thereby cause the coherent radiation to reflect from the selected surface, said probe comprising means integral with the probe for inducing stress in the selected surface;
   phase extraction means for extracting phase information from said coherent radiation reflected from said selected surface,
   wherein said phase extraction means includes a beam splitter for splitting the coherent radiation reflected from said selected surface into two parts, means for phase-shifting one of the two parts, and means for recombining the two parts to thereby create an interference pattern, and
   further comprising image capture means for capturing and recording said phase information, and
   means for rotating said probe about a longitudinal axis thereof to thereby cause said coherent radiation to be directed onto different surfaces of a bore into which the probe is placed, and timing means for synchronizing said image capture means, stress inducing means, and rotating means to cause an image to be captured for each surface simultaneously with a maximum induced stress on said selected surface.

22. Apparatus as claimed in claim 21, wherein said image capture means includes a television camera.

23. Apparatus as claimed in claim 22, wherein said image capture means includes means for digitizing and storing said overlapping images in an electronic buffer for reference at a later time.

24. Apparatus as claimed in claim 22, further comprising means for overlapping successive frames of split and merged items to create a holographic image of the surface, whereby fringes in the holographic image correspond to the applied stress.

25. An apparatus for remote inspection of a selected surface, comprising:
   a radiation source including means for emitting coherent radiation;
   probe means including a probe for guiding said coherent radiation onto a selected surface for reflection from the selected surface;
   means for inducing stress in the selected surface;
   means for extracting phase information from the coherent radiation reflected from said selected surface;
   timing means for causing said phase information extraction means to extract the phase information at a time when stress induced by said stress inducing means on said selected surface is maximum.

26. An apparatus as claimed in claim 25, wherein said radiation source is a laser.

27. Apparatus as claimed in claim 25, wherein said probe is a hollow cylinder and said means for guiding said coherent radiation onto the selected surface comprises first guiding means at one end of said hollow cylinder for guiding said coherent radiation into said hollow cylinder and second guiding means, adjacent the second end of said hollow cylinder for guiding said radiation out of said cylinder onto said selected surface.

28. Apparatus as claimed in claim 27, wherein said second guiding means comprises means for guiding said coherent radiation onto said selected surface in a direction perpendicular to a principal longitudinal axis of said hollow cylinder.

29. Apparatus as claimed in claim 27, said first guiding means comprises a prism, and wherein said hollow cylinder further comprises third guiding means including said prism for guiding coherent radiation reflected from said selected surface to said first end and out of said hollow cylinder.

30. Apparatus as claimed in claim 29, wherein said second guiding means comprises a mirror positioned to reflect coherent radiation from said first guiding means onto said selected surface.

31. Apparatus as claimed in claim 29, wherein said phase extraction means includes a beam splitter for splitting the coherent radiation reflected from said selected surface into two parts, means for phase-shifting one of the two parts, and means for, recombining the two parts to thereby create an interference pattern.

32. Apparatus as claimed in claim 31, further comprising image capture means for capturing an image of said interference pattern.

33. Apparatus as claimed in claim 27, wherein said second guiding means includes a mirror positioned to reflect coherent radiation from said first guiding means onto said selected surface, and to reflect coherent radiation reflected from said selected surface to a third guiding means for guiding coherent radiation reflected from said surface to said first end and out of said hollow cylinder, said third guiding means comprising a prism positioned to reflect coherent radiation received from said mirror onto said phase extraction means.

34. Apparatus as claimed in claim 25, wherein said phase extraction means includes a beam splitter for splitting the coherent radiation reflected from said selected surface into two parts, means for phase-shifting one of the two parts, and means for recombining the two parts to thereby create an interference pattern.

35. Apparatus as claimed in claim 34, further comprising image capture means for capturing and recording said phase information.

36. Apparatus as claimed in claim 35, wherein said phase extraction means comprises means for splitting an image including said phase information into two parallax displaced images and merging the two parallax displaced images onto a focal plane of said image capture means as overlapping images.

37. Apparatus as claimed in claim 36, wherein said image capture means includes a television camera.

38. Apparatus as claimed in claim 37, wherein said image capture means includes means for digitizing and storing said overlapping images in an electronic buffer for reference at a later time.

39. Apparatus as claimed in claim 37, further comprising means for overlapping successive frames of split and merged items to create a holographic image of the surface, whereby fringes in the holographic image correspond to the applied stress.

40. Apparatus as claimed in claim 25, wherein said probe is an elongated member and said stress inducing means comprises a transducer positioned at an end of said elongated member.

41. Apparatus as claimed in claim 40, wherein said transducer is a piezoelectric transducer.

42. Apparatus as claimed in claim 25, wherein said probe comprises an elongated member constructed to enter a bore in a structure to be inspected, said selected surface being located in said bore.

43. Apparatus as claimed in claim 42, wherein said elongated member is a hollow cylinder having a longitudinal axis, one end of said hollow cylinder having mounted thereon said stress inducing means.

44. Apparatus as claimed in claim 43, wherein said stress inducing means comprises a piezoelectric transducer.

45. Apparatus as claimed in claim 44, further comprising means for rotating said elongated member about said longitudinal axis to thereby cause said probe to direct said coherent radiation onto different portions of said selected surface.

46. Apparatus as claimed in claim 45, further comprising means for translating said elongated member in directions parallel to said longitudinal axis to thereby cause said elongated member to enter said bore.

47. Apparatus as claimed in claim 46, further comprising means for translating said elongated member in a direction parallel to said longitudinal axis to thereby cause said elongated member to enter said bore.

* * * * *